July 5, 1927.

I. H. JUDD 1,634,945

FIFTH WHEEL CONSTRUCTION

Filed May 4, 1925 3 Sheets-Sheet 1

INVENTOR.
IRVING-H-JUDD
ATTORNEY.

July 5, 1927.
I. H. JUDD
1,634,945

FIFTH WHEEL CONSTRUCTION

Filed May 4, 1925   3 Sheets-Sheet 2

INVENTOR.
IRVING-H-JUDD
BY
ATTORNEY.

July 5, 1927.
I. H. JUDD
1,634,945
FIFTH WHEEL CONSTRUCTION
Filed May 4, 1925
3 Sheets-Sheet 3
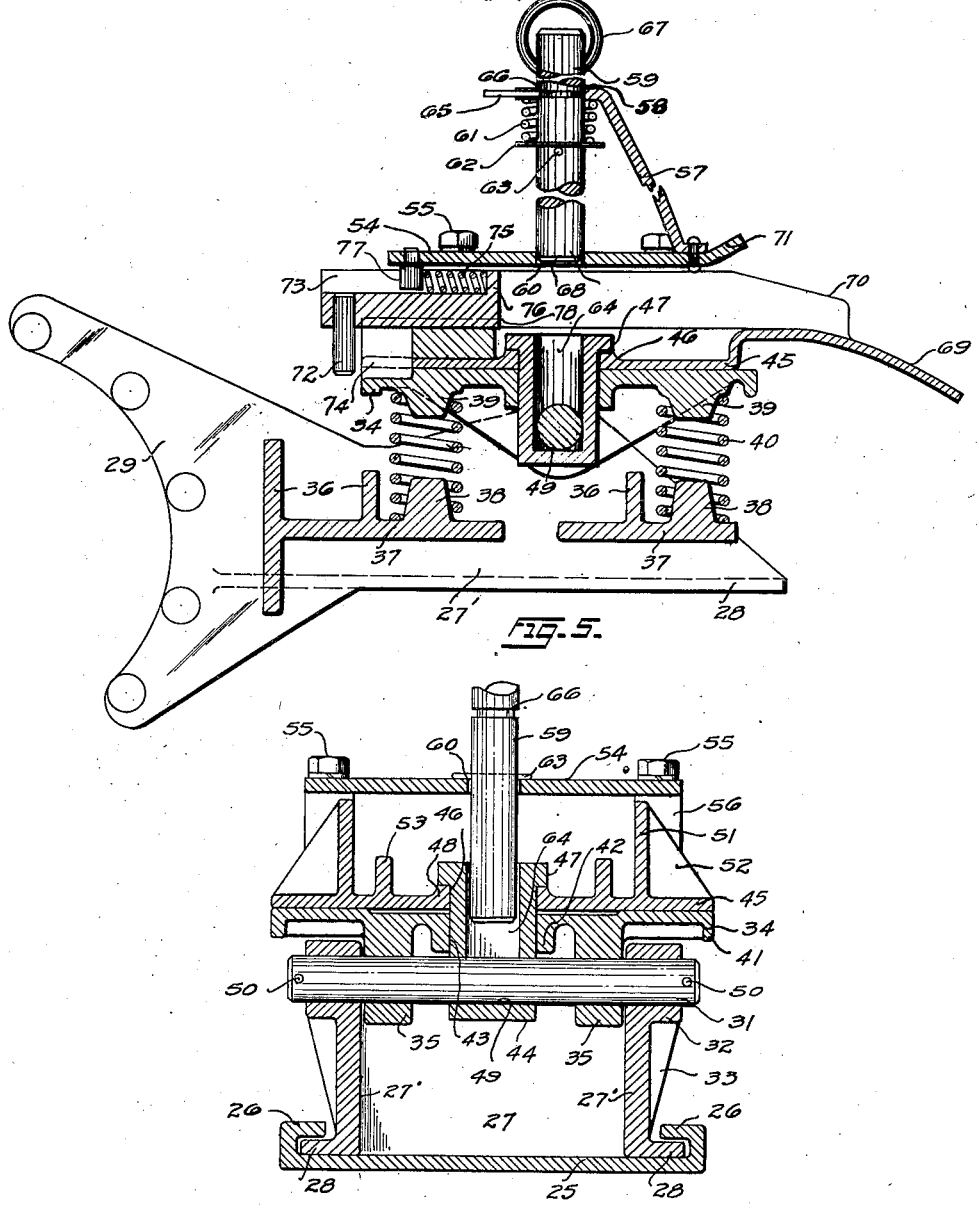
INVENTOR.
IRVING-H-JUDD
BY
ATTORNEY.

Patented July 5, 1927.

1,634,945

UNITED STATES PATENT OFFICE.

IRVING H. JUDD, OF DETROIT, MICHIGAN, ASSIGNOR TO WHITEHEAD AND KALES, INC., OF RIVER ROUGE, MICHIGAN, A CORPORATION OF MICHIGAN.

FIFTH-WHEEL CONSTRUCTION.

Application filed May 4, 1925. Serial No. 27,963.

This invention relates to fifth wheel constructions and more especially to devices of this character employed in connection with tractors and the like when used for hauling trailers, semi-trailers, and the like.

Figure 3:
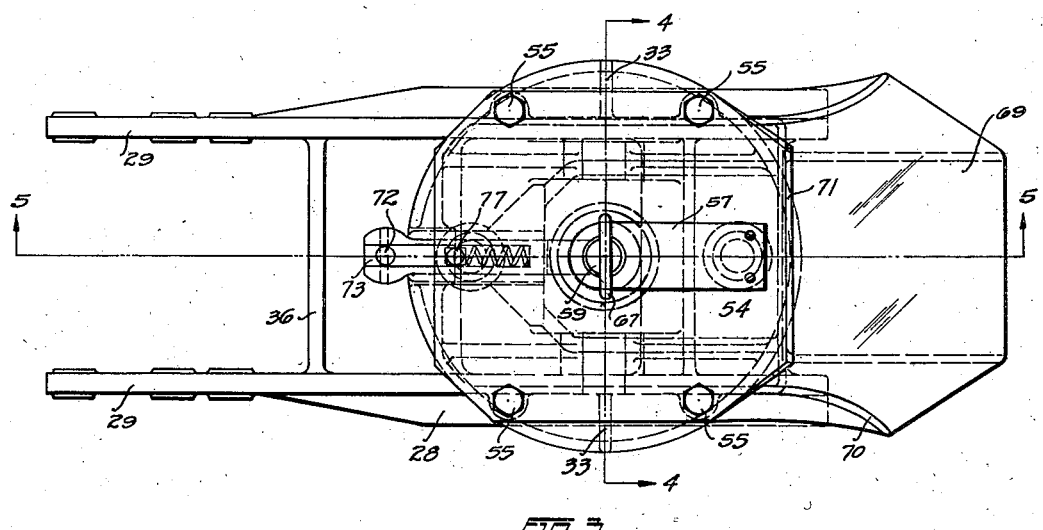

The invention has as some of its objects to simplify, render more efficient, and improve generally devices of this character. Other objects of the invention as well as the advantages thereof and the details of construction of one illustrative example of the invention, will be made more apparent as this description proceeds, especially when considered in connection with the drawings wherein Figure 1 is a fragmentary side elevation of a tractor and trailer showing the application of this invention, Figure 2 is an enlarged side elevation of the fifth wheel with certain associated structures, Figure 3 is a plan view of the fifth wheel illustrated in Figure 2, Figure 4 is a transverse sectional view taken substantially on the plane indicated by the line 4—4 in Figure 3, and Figure 5 is a vertical longitudinal sectional view taken substantially on the plane indicated by the line 5—5 in Figure 3.

Figure 1:
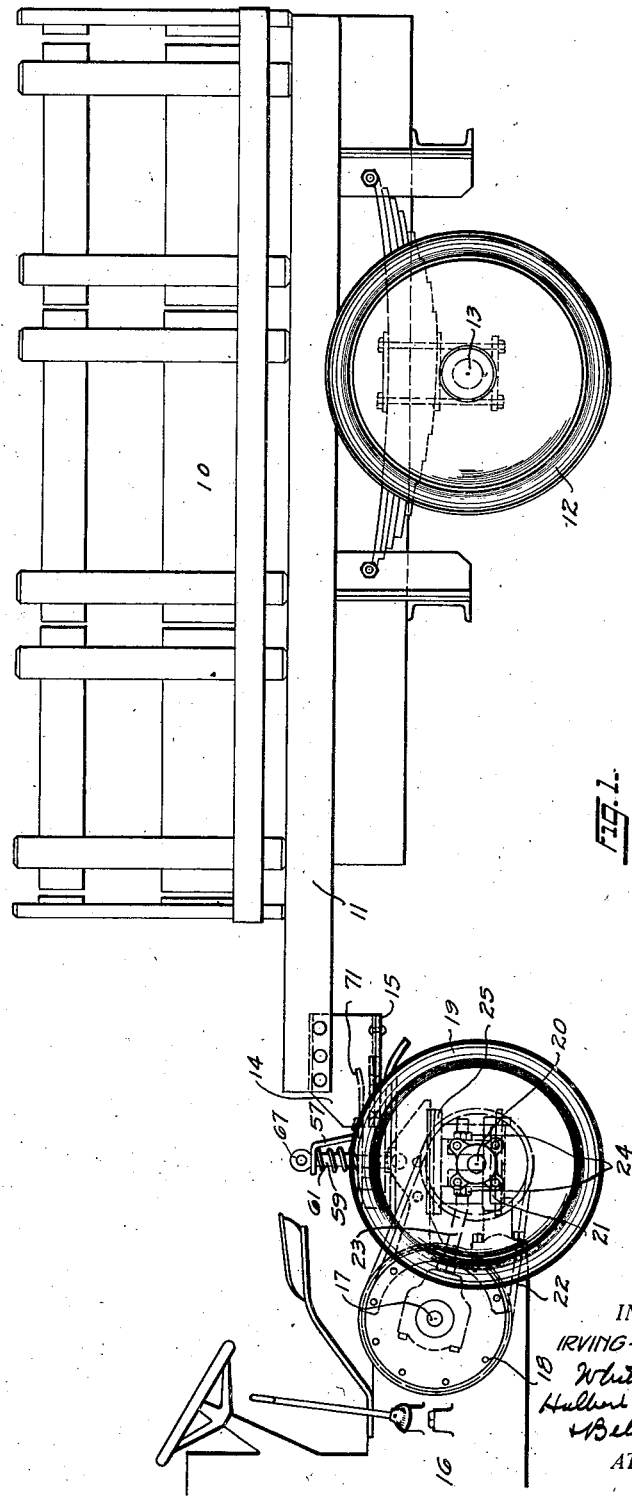
Figure 2:
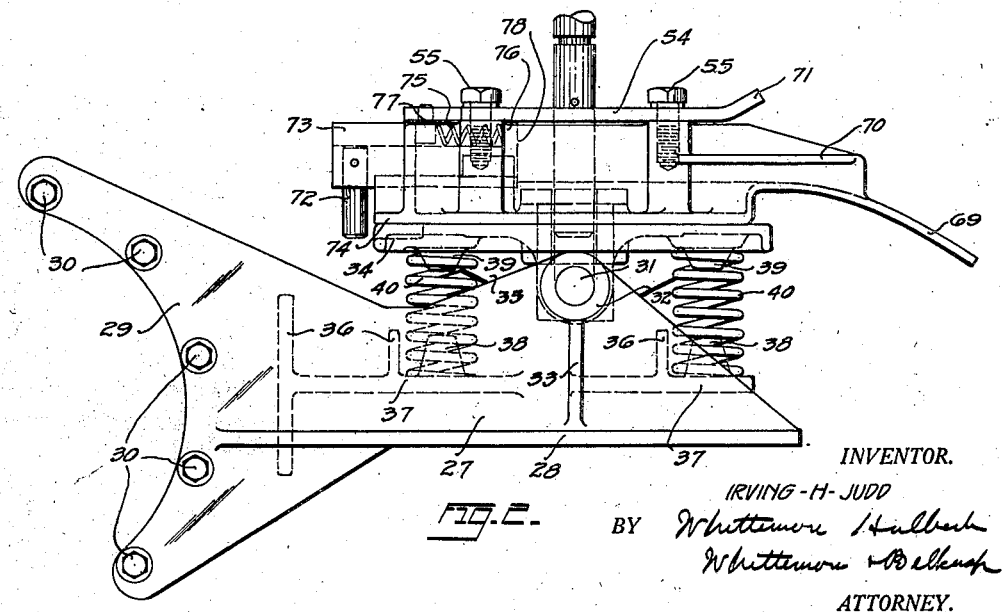

Referring now particularly to the drawings wherein like reference characters indicate like parts throughout it will be noted that in Figure 1 there is illustrated a trailer 10 including the longitudinal frame members 11, and wheels 12 journaled on axle 13. Secured to the forward ends of the frame members 11 is a pair of bracket plates 14, to which is bolted a coupling tongue 15 by means of which the trailer is connected to the fifth wheel constituting the subject matter of this invention. The fifth wheel is herein shown as carried by a tractor 16, a portion of which is conventionally illustrated, while the reference character 17 represents the rear axle of the tractor customarily enclosed by housing 18. In practice the rear wheels proper of the tractor are removed and a pair of wheels 19 substituted therefor, these wheels being mounted on an axle 20 supported in a frame indicated generally by the reference character 21, rotative power being applied to these rear wheels preferably by means of a chain drive 22. The distance between the axles 17 and 20 may be adjusted to compensate for wear in the chain gearing by means of connecting rods 23 connected respectively to the axles 17 and 20 threaded for engagement by adjusting nuts 24. Mounted upon the frame 21 of axle 20 is a plate 25 constituting the support of the fifth wheel, yet to be described, this supporting plate being provided with spaced return bent edges 26 which engage an adjacent portion of the fifth wheel in a manner yet to be described.

While a conventional disclosure of the trailer and tractor structures has been described somewhat in detail it will be immediately apparent that this was for illustrative purposes only so that the application and association of this invention might be the more readily understood, it being equally apparent that any desired form of trailer and tractor may be employed without material alteration of this invention.

The fifth wheel construction consists essentially of a main supporting member 27 in the form of vertically arranged side plates 27' provided with laterally extending edges constituting side flanges 28 which engage under the return-bent edges 26 of supporting plate 25 of axle frame 21, and are suitably secured thereto. Each of these main supporting members 27' is provided with an enlarged end portion 29 of semi-circular configuration and suitably apertured at a plurality of spaced points for the reception of bolts 30, by means of which the supporting member is bolted to a circumferential sector of the cylindrical axle housing 18. This connection between the parts is such that the flanges 28 extend in a substantially horizontal plane as illustrated. The side plates of the main supporting member 27 are further provided adjacent their rearward ends with vertically extending portions suitably apertured for the reception of a shaft 31, by means of which the rockable section of the fifth wheel, yet to be described, is supported. If desired the apertures in which the shaft 31 is mounted may be surrounded by suitable reinforcing bosses 32 which merge into vertically extending strengthening ribs 33.

The rockable section 34 of the fifth wheel is provided with a pair of downwardly extending ears or lugs 35 engageable with shaft 31, whereupon this section of the fifth wheel is securely but rockably mounted upon the main supporting member 27.

Arranged between the side plates 27' of the main supporting member 27 is a plurality of vertically extending spaced reinforcing ribs 36 and a plurality of horizontally extending web plates 37. Extending upwardly from the reinforcing webs 37 are a pair of studs 38, and on the rockable section 34 is a pair of aligned downwardly extending studs 39. A pair of equalizing or equilibrium springs 40 engage these studs, bearing respectively against the main supporting member and against the rockable section of the fifth wheel. Inasmuch as these equalizing springs are arranged on opposite sides of the point of pivotal support of section 34 it follows that the rockable section of the fifth wheel will be normally maintained in the substantially horizontal position illustrated in Figure 2.

The section 34 of the fifth wheel is preferably substantially circular in plan view and may be formed with a peripheral downwardly extending flange 41, and a centrally arranged downwardly extending flange 42, surrounding a central aperture 43 adapted to receive a hollow king pin or king pin sleeve 44.

Mounted upon the upper face of section 34 is an upper section 45 of the fifth wheel, this section being centrally apertured as at 46, for engagement with the hollow king pin 44, this latter member being preferably provided with a laterally extending flange or collar 47 which engages an upstanding flange 48 on the fifth wheel section 45. Hence the king pin 44 constitutes a center for the fifth wheel sections 34—45, whereupon a relative rotative movement between these two parts is permitted in a manner to be later described.

The lower solid end of king pin 44 is transversely apertured as shown at 49 for the reception of transversely extending shaft 31. It will be noted from an examination of Figure 4 that with such a construction shaft 31 may be inserted endwise through the aligned apertures in supporting members 27', depending ears 35, and king pin 44, and if pins 50 or the like are thereafter inserted through the ends of shaft 31 the parts just described will be securely locked together.

The upper section 45 of the fifth wheel is provided with a pair of longitudinally extending upstanding sides 51 with suitable reinforcing ribs 52, these sides 51 defining therebetween a space into which the coupling tongue 15 of the trailer is adapted to be inserted. The bottom of this space is defined by the section 45 of the fifth wheel and extending upwardly therefrom is a plurality of longitudinal guide ribs 53, whose upper edges are slightly above the horizontal plane of the upper end of king pin 44. Consequently during the coupling engagement of the parts the tongue 15 will rest upon the ribs 53 slightly spaced from the upper end of king pin 44.

Mounted upon the upper fifth wheel section 45 and extending over the space defined by the sides 51 is a top or cover plate 54, this plate being secured in position preferably by bolts 55 threaded into upright bosses 56 formed on fifth wheel section 45. Secured to the plate 54 is a bracket 57. The upstanding spaced end of the bracket 57 is apertured as at 58 for the reception of a coupling pin 59 which engages also in an aperture 60 in plate 54, this latter aperture being vertically aligned with aperture 58. The coupling pin 59 is therefore slidably supported for vertical reciprocation by the members 54 and 57 and is held normally in its lower position by means of spring 61, which abuts on the one hand bracket 57 and on the other a washer 62, secured on the pin 59 by any suitable means such as a cotter pin 63 or the like. This spring normally urges pin 59 downwardly into a position where its lower edge enters the vertically extending recess 64 of king pin 44. The downward movement of coupling pin 59 is limited by the engagement of cotter pin 63 with plate 54. In this position pin 59 is in locking position, having passed thru an aperture in coupling tongue 15.

Coupling pin 59 is maintained in its raised position against the action of spring 61, by means of locking pin 65 slidably mounted in the upper end of bracket 57, and adapted to engage a circumferential groove 66 in pin 59. The pin 59 may be provided with a ring 67 or other suitable operating means, while the lower end 68 may be tapered as shown to facilitate the engagement of the pin with the aperture in the coupling tongue and with recess 64 of king pin 44.

To facilitate the engagement between the coupling tongue and the fifth wheel the following structure is provided: The rear side of fifth wheel section 45 is formed with a downwardly curved or inclined projecting tongue or member 69, and with cooperating curved and inclined vertical side walls 70 which are adapted to have a bearing and guiding engagement with coupling tongue 15 for directing the same between vertical sides 51. In addition the adjacent edge of top plate 54 is curved or flared upwardly as at 71. This arrangement of parts cooperates to guide and direct the coupling tongue so as to place the aperture therein in position to be engaged by the coupling pin 59 as will be readily apparent.

During the coupling engagement it is essential that the sections 34 and 45 of the fifth wheel be held against relative rotation and for this purpose there is provided a locking pin 72 carried by a locking slide 73 mounted in the upper section 45 of the fifth wheel. The slide 73 is movable radially with reference to the axis of rotation of the parts and in its locking position the pin 72 engages in a locking recess 74 formed by cutting away adjacent portions of fifth wheel sections 34 and 45 (see particularly Figure 2.) A spring 75 bearing respectively against an upstanding abutment 76 carried by slide 73 and against a downwardly extending abutment 77 carried by plate 54 normally urges slide 73 to the right as seen in Figure 2, or in other words, into locking position with pin 72 in recess 74 However during the coupling operation the forward end of coupling tongue 15 will engage the end 78 of slide 73 and move the same against the action of spring 75, and will maintain the slide 73 in this position during the time the tongue 15 is coupled to the fifth wheel. This position of slide 73 is illustrated in Figure 2 and it will be noted that the pin 72 is out of engagement with recess 74 so that a relative rotation between the fifth wheel parts 34 and 45 may take place.

In order to effect an automatic coupling of the tongue 15 with the fifth wheel, coupling pin 59 will be released from engagement by locking pin 65 and permitted to bear with its lower end upon slide 73. Therefore when this slide is moved radially outwardly by tongue 15, coupling pin 59 will automatically engage with the aperture in tongue 15 and with the recess in king pin 44.

The method of operation, the advantages and functions, of the construction hereinbefore described will be readily apparent without a detailed reference thereto. However it should be noted that in coupling the trailer to the tractor the coupling tongue 15 of the former will be guided into coupling engagement by means of the guiding and directing parts 69, 70, and 71. This coupling tongue will then pass between the upright sides 51 of the upper fifth wheel section 45, resting upon ribs 53. During the coupling of the parts coupling pin 59 will be held in its raised position against the action of spring 61 by engagement with slide 73. As the coupling tongue passes into superposed relation with the fifth wheel its forward edge will push locking slide 73 outwardly, moving locking pin 72 to unlocked position. When the aperture in coupling tongue 15 is in alignment with aperture 64 of king pin 44 spring 61 will force coupling pin 59 into coupling position, wherein it passes through the aperture in coupling tongue 15 and enters recess 64 in king pin 44.

With this arrangement accidental disengagement of the coupling tongue with the fifth wheel is prevented, excessive vertical movement of the coupling tongue is prevented as it is practically confined between ribs 53 and top plate 54, and excessive lateral movement or relative rotation with reference to upper fifth wheel section 45 is prevented by reason of the upstanding sides 51.

As has heretofore been mentioned shaft 31 cooperates to securely unite the three fifth wheel sections 27, 34, and 45 but, however, permits a rocking of the two upper sections, which movement is resisted by springs 40 and a relative rotation between the two lower sections on the one hand and the upper section on the other.

The above described arrangement constitutes a rigid, durable, and commercially satisfactory construction, capable of efficient operation and of manufacture at a reasonable cost. It is obvious, however, that various modifications of the specific arrangement herein described and illustrated may be made without departing from the spirit and scope of this invention and to this end reservation is made to make such changes as may come within the purview of the accompanying claims.

What I claim as my invention is:

1. In a fifth wheel construction, a main supporting member, a pair of relatively rotatable sections, a king-pin pivotally connecting said sections, and means engaging said main supporting member, one of said sections and said king-pin for holding the fifth wheel parts in assembled relation.

2. A fifth wheel construction comprising, a main supporting member, upper and lower sections, a king-pin rotatably connecting said sections and means rockably connecting said lower section to said support, said means also engaging said king-pin for holding said sections and support in assembled relation.

3. A fifth wheel construction comprising, a main supporting member, upper and lower sections, a king-pin rotatably connecting said sections, a collar on said king-pin at one end preventing longitudinal displacement of said sections, and means rockably connecting said lower section to said support, said means also engaging said king-pin for holding said sections and support in assembled relation.

4. A fifth wheel construction comprising, a main supporting member, upper and lower sections, a king-pin rotatably connecting said sections, means rockably connecting said lower section to said support, said means also engaging said king-pin for holding said sections and support in assembled relation, and springs for resisting the rocking of said section.

5. A fifth wheel construction comprising, a main supporting member, upper and lower sections, a king-pin rotatably connecting said sections, means rockably connecting said lower section to said support, said means also engaging said king-pin for holding said sections and support in assembled relation, and springs carried by said support and engaging said lower section on both sides of said rockable connection.

6. A fifth wheel construction comprising, a main support, upper and lower relatively rotatable sections, means connecting said sections and support, and side and top walls or the upper of said sections for guidingly receiving the coupling tongue of a trailer or the like.

7. A fifth wheel construction comprising, a main support, a pair of relatively rotatable sections, means connecting said sections and support, an automatically operable coupling pin mounted on one of said sections, and a latch carried by one of said sections normally holding said pin in inoperative position and normally holding said sections from relative rotation.

8. A fifth wheel construction comprising, a main support, a pair of relatively rotatable sections, a recessed king-pin rotatably connecting said sections, and a coupling pin carried by one of said sections and adapted to engage said recess.

9. A fifth wheel construction comprising, a main support, upper and lower sections, a recessed king-pin rotatably connecting said sections, side and top defining partitions carried by said upper section and adapted to receive the coupling tongue of a trailer or the like, and a coupling pin carried by said top and engageable in said recess.

10. A fifth wheel construction comprising, a main support, upper and lower sections, a recessed king-pin rotatably connecting said sections, side and top defining partitions carried by said upper section and adapted to receive the coupling tongue of a trailer or the like, and a coupling pin carried by said top and projectable through the coupling tongue and into said king-pin recess for connecting said coupling tongue to said fifth wheel.

11. A fifth wheel construction comprising, a main support, a pair of relatively rotatable sections, a coupling pin mounted on the upper of said sections, a spring normally urging said pin into operative position, and a latch, rendered inoperative by the coupling tongue of a trailer or the like, normally holding said pin in inoperative position.

12. A fifth wheel construction comprising, a main support, a pair of relatively rotatable sections, a latch for preventing relative rotation of said sections and means operable upon the engagement of the coupling tongue of a trailer or the like for releasing said latch.

13. A fifth wheel construction comprising, a main support, a pair of relatively rotatable sections, a spring influenced latch normally preventing rotation of said sections, a part of said latch projecting into the path of the coupling tongue of a trailer or the like during coupling engagement, whereby said latch is moved to inoperative position upon the completion of the coupling operation.

14. The combination with the rear axle housing of a tractor or the like, of a fifth wheel comprising, a main support secured to said housing, upper and lower relatively rotatable sections, a headed king-pin rotatably connecting said sections and engaging the upper section with its head, ears formed on the lower sections, and a rocker shaft passing through aligned apertures in said main support, ears, and the end of said king-pin remote from said head.

15. The combination with the rear axle housing of a tractor or the like, of a fifth wheel comprising, a main support secured to said housing, upper and lower relatively rotatable sections, means rotatably connecting said sections, means rockably mounting said sections on said support, and equalizing springs carried by said support and engaging said sections on both sides of said rockable connection.

16. The combination with the rear axle housing of a tractor or the like, of a fifth wheel comprising, a main support secured to said housing, upper and lower relatively rotatable sections, means rotatably connecting said sections, means rockably connecting the lower section to said support, side members and a top carried by said upper section defining a coupling tongue recess, and a coupling pin mounted on said top projectable into said recess for engaging a coupling tongue or the like.

17. The combination with the rear axle housing of a tractor or the like, of a fifth wheel comprising, a main support secured to said housing, upper and lower relatively rotatable sections, means rotatably connecting said sections, means rockably connecting the lower section to said support, side members and a top carried by said upper section defining a coupling tongue recess, a coupling pin mounted on said top projectable into said recess, and coupling tongue directing flanges on said upper section.

18. A fifth wheel construction, comprising, a main support, a pair of relatively rotatable sections, means connecting said sections and support, a coupling pin reciprocably mounted on one of said sections, and means operable upon the engagement of a coupling tongue or the like for causing said pin to move to coupling position.

19. A fifth wheel construction comprising, a main support, a pair of relatively rotatable sections, a coupling pin reciprocably mounted on one of said sections, means for preventing relative rotation of said sections and for holding said pin in inoperative position, said means being engageable by the coupling tongue of a trailer or the like and operable thereby to release said sections and pin.

20. In a fifth wheel construction, a main supporting member, lower and upper sections relatively rotatable, means rockably supporting said sections on said supporting member, a coupling pin carried by the upper section, and a spring-influenced member positioned upon the lower section normally holding said pin in inoperative position.

21. In a fifth wheel construction, a main supporting member, a pair of relatively rotatable sections rockably mounted upon said main supporting member, a coupling device associated with the upper of said sections, a member slidably positioned on one of said sections normally operable to hold said coupling device in inoperative position and for preventing relative rotation of said sections.

In testimony whereof I affix my signature.

IRVING H. JUDD.